Oct. 3, 1967

A. R. PERRINS 3,345,557

ELECTRIC POWER STABILIZING REGULATOR
RESPONSIVE TO PLURAL CONDITIONS

Filed June 26, 1964

INVENTOR.
Allen R. Perrins
BY
Johnson and Kline
ATTORNEYS

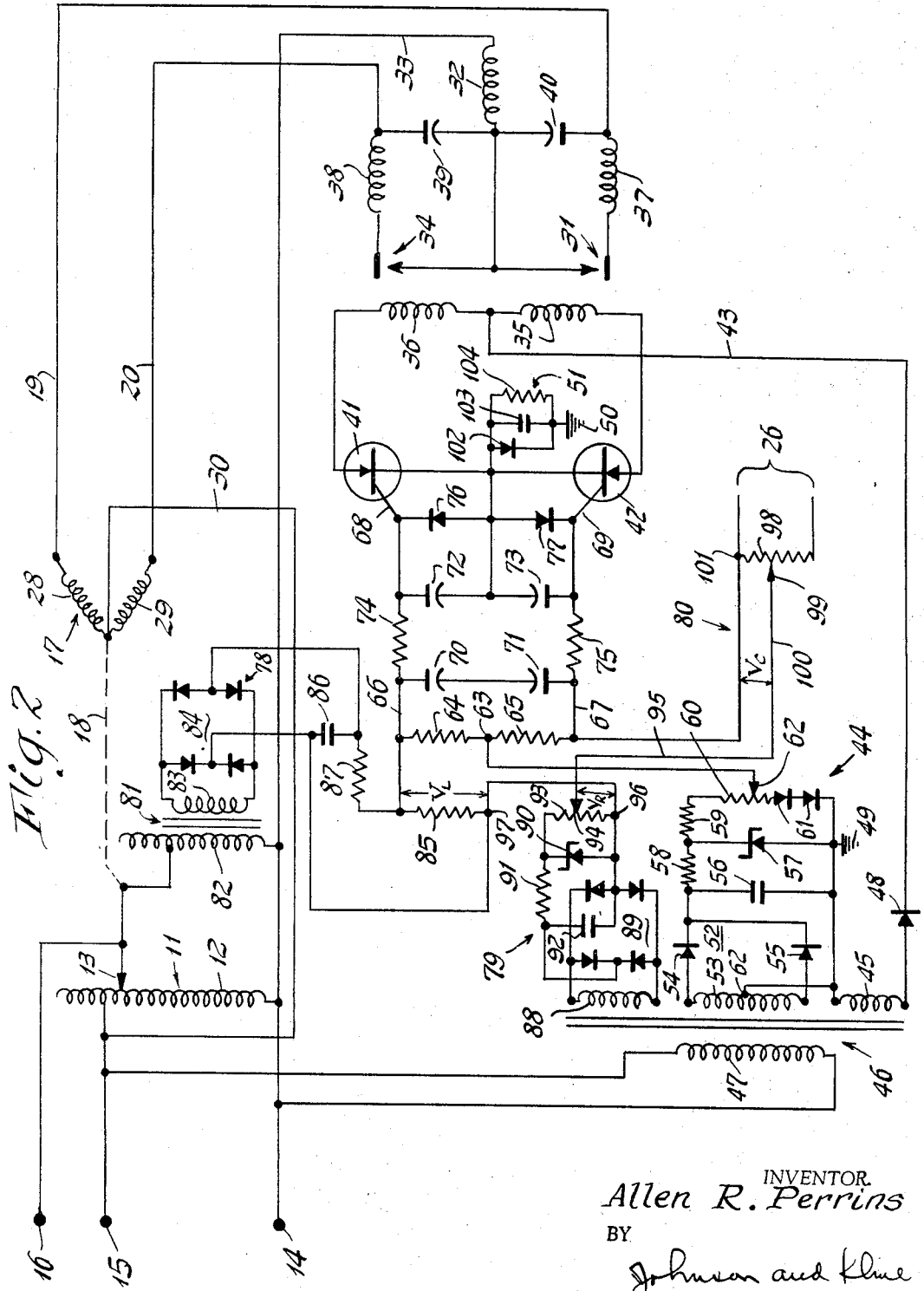

United States Patent Office 3,345,557
Patented Oct. 3, 1967

3,345,557
ELECTRIC POWER STABILIZING REGULATOR RESPONSIVE TO PLURAL CONDITIONS
Allen R. Perrins, Cheshire, Conn., assignor to The Superior Electric Company, Bristol, Conn., a corporation of Connecticut
Filed June 26, 1964, Ser. No. 378,135
4 Claims. (Cl. 323—43.5)

ABSTRACT OF THE DISCLOSURE

A stabilizing regulator for maintaining the required voltage to a load by adjusting for input voltage changes and load requirements through the use of a control signal that is the algebraic sum of a unidirectional reference voltage, a voltage related to the actual value of the output voltage and a voltage necessary to satisfy the load requirements.

---

In many applications, a desired condition of an electrical load may be maintained substantially constant simply by sensing the value of the voltage to the load and providing a voltage regulator to maintain the load voltage substantially constant. However, such instances are generally limited to controlling electric loads in which a change in the output voltage causes substantially simultaneously a change in the desired condition. One example of such an application is controlling the illumination of electric lights by controlling the power thereto. In other circumstances, however, where a change in the output voltage will effect an altering in the desired condition of the electrical load but only after a time lag, there being other factors that may also change the condition, the voltage to the load has generally been controlled by sensing the condition. One example of such an instance is in an oven heated by electricity in which the temperature is desired to be maintained constant. While a change in voltage to the oven causes a change in temperature thereof, there is a time lag between a voltage change and a condition change. Thus if the output voltage is altered by a change in the input voltage, this latter change will not be readily detected and overcome by just sensing the condition. Accordingly, though both applications individually have found utility, the latter application has not been particularly satisfactory because of the inability to immediately overcome changes in the output voltage caused by the line voltage alterations which subsequently effect the condition and cause the loss of preciseness in maintaining substantially constant a desired condition.

It is accordingly an object of the present invention to provide a stabilizing regulator for maintaining substantially constant a desired condition of an electric load by overcoming a change in either the condition or a change in the line voltage to the regulator from a source of electrical energy.

Another object of the present invention is to provide such a stabilizing regulator in which the value of the output voltage is regulated to compensate for changes in line voltage and in which the value of output voltage is also stabilized to achieve a substantially constant desired condition of an electric load with the value of the output voltage capable of being charged individually by either to increase the preciseness to which the desired condition is maintained.

A further object of the present invention is to provide a stabilizing regulator which is responsive to changes in two different factors but yet which is relatively economical to manufacture, accurate and durable in use.

In carrying out the present invention, there is provided a pair of input terminals included in the stabilizing regulator which are connectible to a source of alternating current and a pair of output terminals that are connected to the electric load. The voltage at the output terminals is varied or regulated to maintain substantially constant a desired condition of the load with the value of the output voltage being regulated by a regulating means having one channel which when energized causes an increase in the value of the output voltage and another channel which when energized causes a decrease in the value of the output voltage.

In order to achieve the above-noted objects compensation in the value of the output voltage is immediately made for changes in the voltage of the source or line voltage by a circuit which produces a voltage indicative of the value of the output voltage and hence the line voltage by a change in the former being reflected as a change in the latter. In addition, the condition of the electric load is indicated by the value of an electric signal, with the signal appearing as a value of a voltage that varies with the condition which the load is desired to have. These two voltages are combined in such a manner that either individually may control the regulating means to cause a change therein but yet changes therein which would require opposing movements of the regulator are automatically compensated for and only the algebraic sum of the required change is the final signal that controls the regulating means. In this manner the present invention enables the output voltage to immediately be changed to compensate for changes in line voltage which, if such were not accomplished, would undoubtedly cause a change in the condition desired to be maintained substantially constant but only after a substantial time lag. However, by the time a change in the condition is reflected in its voltage to effect an alteration in the output voltage, such an alteration would not be immediately reflected as a change in the condition voltage because of the substantial delay in the change of the condition after an alteration in the output voltage. Thus the present invention obviates the delayed reaction of the condition voltage which may be caused by a line voltage change and thus enables the stabilizing regulator to more accurately and within finer limits control the condition of the electric load that is desired to be maintained constant.

Other features and advantages will hereinafter appear.

In the drawing:

FIG. 2 is a schematic diagram of the stabilizing regulator of the present invention.

Figure 1:
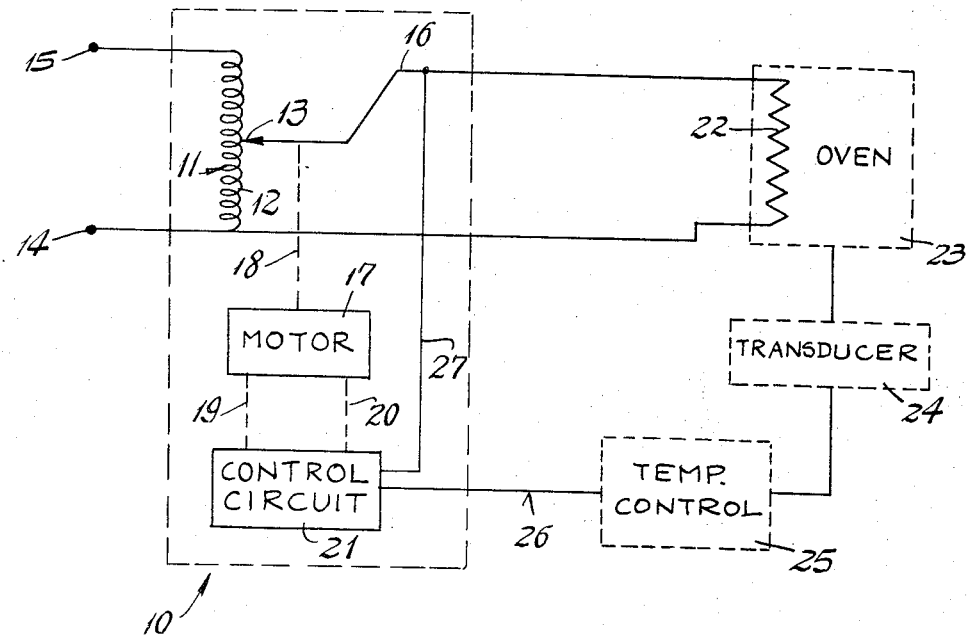
FIGURE 1 is a block diagram of a system employing the present invention.

Referring to the drawing, FIG. 1, the automatic stabilizing regulator of the present invention is generally indicated by the reference numeral 10 and includes a regulating means which is specifically herein disclosed as an adjustable voltage autotransformer 11 having a winding 12 on which a tap 13 is movable to be in slidable electrical engagement therewith, as is well known in the art. The ends of the winding 12 are connected to a pair of input terminals 14 and 15 which in turn are connectible to a source of alternating current while the output of the autotransformer and hence the regulator appears between the terminal 14 and an output terminal 16 connected to the tap 13. Movement of the tap 13 on the winding 12 is controlled by an electric motor, generally indicated by the reference numeral 17, which is mechanically connected, as indicated by the dotted line 18, to effect movement of the tap 13.

The motor 17 is of a reversible type, such as disclosed in United States Patent No. 2,982,872, and includes a first channel 19 and a second channel 20 so that power on the first channel 19 from a control circuit 21 energizes it with alternating current to cause rotation of the motor in one direction while power in the second channel 20 energizes it to cause the motor to rotate in the other or reverse direction. It will be appreciated that rotation of the motor by energization of the channel 19 serves to decrease the value of output voltage appearing at the terminals 14 and 16 while energization of the channel 20 causes the value of output voltage to increase at these output terminals.

The value of the output voltage is set by the position of the tap 13 on the winding 12 and it is caused to be moved and hence change the output voltage by actuation of the motor 17 as determined by the control circuit 21. The value of the output voltage is employed to maintain substantially constant a desired condition in an electrical load. In the specific embodiment of the invention herein disclosed, though it is to be understood that the invention in the automatic stabilizing regulator is not to be limited thereto, the electric load consists of a resistance element 22 used to provide heat to maintain a desired temperature within an oven 23. For sensing the condition of the temperature there is provided a transducer 24 (such as a thermocouple) and a temperature control 25. The temperature control 25 through a line 26 is connected to the control circuit 21 and provides thereto a unidirectional current having a value which is indicative of the value of output voltage of the regulator necessary to achieve the desired condition of the oven. Thus while the signal may be at times directly proportional to the actual temperature, generally because of various factors for which compensation by the control circuit is required, the signal is not. Hence the value of the signal may be, for example, high when the oven is being initially heated or at a minimum when the oven is overheated. Such a transducer and temperature control is available from many manufacturers, one being the Foxboro Company, Foxboro, Mass., with the output signal on a model 62–4 being within a 10–50 ma. range.

The control circuit 21 in addition to responding to the value of the signal from the electric load to set the output voltage is also connected by a line 27 that provides another signal to which the control circuit is responsive. The signal in the line 27 is indicative of the actual value of output voltage but yet as the output voltage, by reason of the autotransformer 11, varies with the input voltage or line voltage to which the input terminals 14 and 15 are connected, a change in input voltage will immediately cause a change in the value of the signal in the line 27. Thus in acordance with the present invention the value of output voltage is determined both by the value necessary to achieve a condition of the electric load and also by the value of the input voltage.

Referring to the electric schematic diagram, FIG. 2, the input terminals 14 and 15, output terminals 14 and 16, autotransformer 11 with winding 12 and tap 13 and the motor 17 connected as by 18 to the tap 13 are shown. The motor 17 has a first winding 28 and a second winding 29 with the windings having a common junction lead 30 connected to the input terminal 15. The first channel 19 is connected to the winding 28 and the second channel 20 is connected to the winding 29 for energizing one winding or the other with alternating current to cause an increase in output voltage and a decrease in output voltage respectively. Naturally, if the output voltage is at its necessary value, neither channel is energized. The first channel 19 is energized through a normally open relay switch 31 which through an RF choke 32 is connected by a lead 33 to the input terminal 14. Similarly the channel 20 includes a normally open relay switch 34 also connected to the lead 33. Relay switch 31 is actuated by a relay coil 35 which upon energization closes the switch while the relay switch 34 is actuated by a relay coil 36 that also upon energization closes the switch 34. Closure of the switch 34 energizes the channel 20 and hence the second winding 29 across the input terminals 14 and 15 while closure of the switch 31 by energization of the relay coil 35 energizes the channel 19 and hence the first winding 28. For decreasing sparking and RF interference, chokes 37 and 38 and condensers 39 and 40 connected in the manner shown are provided.

The energization of the relay coils 35 and 36 is effected in the control circuit 21 by gate controlled diodes, specifically herein, a first silicon controlled switch (SCS) 41 and a second SCS 42 though similar acting devices may be employed if desired. Each SCS is normally non-conducting in its anode-cathode path but upon a voltage signal appearing between a gate and cathode, it is triggered to render its anode to cathode path conducting. The relay coil 36 is energized upon conduction through the SCS 41 with the relay coil 35 similarly energized upon the conduction through the SCS 42. In the embodiment of the invention disclosed, the relay coil 36 is connected between the anode of the SCS 41 and a lead 43 while the relay 35 is connected between the anode of SCS 42 and the lead 43. The lead 43 is the positive side of a half-wave power supply, generally indicated by the reference numeral 44 that includes a secondary winding 45 of a transformer 46 having a primary winding 47 connected to the input terminals 14 and 15 and a one-way valve 48 in the lead 43. Thus the power supply 44 places across the anode-cathode of each SCS a half-wave unidirectional current by reason of a ground 49 connected to the other half of the secondary winding 45 and a ground 50 connected to the cathodes of the SCS 41 and 42 through an anticipation network 51 that is more fully hereafter set forth.

The transformer 46 further provides a gate cathode bias supply for the SCS's, the circuit being indicated generally by the reference numeral 52 and includes a secondary winding 53, one-way valves 54 and 55, a filtering capacitor 56 and a breakdown or Zener diode 57 together with resistances 58 and 59 connected in the manner shown. Moreover, there is provided a sensitivity potentiometer 60 connected through temperature compensating diodes 61 to the ground 49. The tap 62 of the potentiometer 60 is connected to a common junction 63 between two similar resistances 64 and 65, each of which is connected through a lead 66 and 67 to the gates 68 and 69 of the SCS's 41 and 42 respectively. For filtering and to provide the proper voltages, condensers 70, 71, 72, 73 and resistances 74 and 75 together with reverse voltage gate protecting diodes 76 and 77 are interconnected between the leads 66 and 67 and the SCS's 41 and 42. It will be understood that adjustment of the potentiometer 60 serves to place between the gate and the cathode of each SCS a positive to negative bias voltage respectively having a value that is adjustable by the tap 62 thereof and thereby provides for controlling the sensitivity of the SCS's as will be hereinafter apparent by decreasing the value of a signal that is necessary to effect conduction of the SCS's.

The bias voltage between the gate and cathode of each SCS is insufficient in value to cause conduction of an SCS and hence energization of either the channel 19 or 20 is effected by impressing between the gates and cathodes a signal voltage which has one sense or polarity when it is desired to energize the channel 19 and another sense when it is desired to energize the channel 20. This signal voltage is derived from algebraically adding a voltage produced by an output voltage sensing circuit, generally indicated by the reference numeral 78 that produces a unidirectional voltage related to the value of the actual output voltage and changes therein caused by changes in the value of the input voltage at terminals 14 and 15; a reference circuit indicated by the reference numeral 79 that produces a value of unidirectional voltage which is constant but yet may be adjusted in value to properly set the regulator as will more fully be understood hereinafter; and a condition circuit 80 that accepts a unidirectional signal on the line 26 that is indicative by its value, of the value of the output voltage that the temperature controller dictates is necessary to achieve the temperature or condition in the oven or electric load.

Referring specifically to the output voltage and line voltage change sensing circuit 78, there is provided a transformer 81 having a primary winding 82 connected to the output terminals 14 and 16 and having a secondary winding 83, whose output is rectified by a full-wave rectifier 84 connected in the manner shown. A resistance 85 is connected across the output of the rectifier 84 to thus have thereacross a unidirectional voltage which is related to the actual output voltage. Preferably a filtering capacitor 86 and another resistor 87 are included; the latter may be adjustable if desired to enable an initial setting of the regulator to for example compensate for tolerances in the components, circuit voltage losses, etc.

The reference circuit 79 includes a winding 88 on the transformer 46 connected to a full-wave rectifier 89 that produces a unidirectional current across a breakdown or Zener diode 90 connected across the output of the rectifiers. Additionally, a resistance 91 and filtering capacitor 92 are provided. With this structure, there is produced from the rectifiers 89 across the breakdown diode 90 a voltage sufficient to cause the diode to reversely conduct and hence produce a substantially constant voltage thereacross. A potentiometer 93 having a tap 94 is connected in parallel with the diode 90 with the tap being connected to a lead 95 and the negative polarity end 96 of the potentiometer 93 being connected to the positive polarity end 97 of the resistance 85. The potentiometer 93 enables the value of the reference voltage to be adjusted.

The circuit 80 includes an adjustable potentiometer 98 having a tap 99 connected to a lead 100 that also is connected to the tap 94 and lead 95. Additionally, the negative polarity end 101 of the potentiometer is connected to the lead 67. As heretofore mentioned, the signal in the line 26 is a unidirectional current and the potentiometer enables the translation thereof into a unidirectional voltage. Furthermore by being adjustable the extent of the translation may be properly adjusted to the other components of the regulator 10 thus enabling various current ranges, as may occur in different kinds and types of electric loads, to be accommodated in addition to enabling one regulator to be able to be interconnected in different systems having different ranges of values of signals.

In the operation of the above-described circuit it will be understood that the condition indicating voltage as represented by the character $V_C$, the reference voltage indicated by the character $V_R$ and the output or line change sensing voltage indicated by the character $V_L$ are all algebraically added to produce one algebraic sum signal. The value of the sum signal may be either insufficient to cause firing of an SCS or sufficient to cause firing, with the value being substantially set by the gate cathode bias circuit supply 52. If the value is sufficient to cause firing the polarity of the sum signal determines which SCS 41 or 42 will be rendered conducting and hence whether the output voltage will be increased or decreased. More specifically the reference voltage $V_R$ and the line voltage sensing voltage $V_L$ are additive while the condition voltage $V_C$ is subtractive. The algebraic sum of these three voltages is impressed across the resistances 64 and 65 at the ends thereof connected to the leads 66 and 67 respectively.

With the above-described components in the operation of the regulator during normal operating conditions when the output voltage is at a value which maintains the condition of the load at its desired condition, neither SCS is fired. In addition the voltages $V_R$ and $V_L$ substantially equal the voltage $V_C$, with the difference being less when added to the voltage from the gate cathode circuit 52 to cause conduction of an SCS. If the line voltage from the source increases, $V_R$ and $V_C$ remaining constant, then $V_R$ plus $V_L$ increase in value thus rendering lead 66 negative with respect to lead 67 and if of sufficient value causes SCS 42 to become conductive, closing switch 31 to energize the winding 28 causing the tap 13 to move in effect downward on the winding 12, to produce a decreased voltage. If, of course, the line voltage decreases then the converse occurs with lead 67 becoming negative with respect to lead 66, SCS 41 becoming conductive, winding 29 energized and the motor 17 moves the tap 13 to increase the output voltage.

If the temperature controller 25 increases its value of output signal in the line 26 such as may be caused by a lower temperature in the oven 23 than that desired, then the lead 66 becomes positive with respect to the lead 67 causing closure of the switch 34 and energization of the winding 29 to increase the output voltage. The converse would also hold true if the output voltage is producing a temperature higher than desired and hence the signal in the line 26 would decrease, causing a closing of switch 31 to energize winding 28 and hence decrease the output voltage.

It will be appreciated that whenever the temperature controller dictates and causes a change in the output voltage of the regulator, that the voltage $V_L$ will also change. However, such a change in value of the $V_L$ voltage does not alter the effect of the $V_C$ voltage to prevent changing the output voltage because these voltages are oppositely effective in changing the output voltage as for example, the former would increase if $V_C$ increases and/or $V_L$ decreases.

The voltage in the line 26 generally ranges from a minimum to a maximum and the reference voltage $V_R$ is preferably selected to be at least equal to the minimum voltage of $V_C$. Moreover, it will be appreciated that either the voltage $V_L$ or the voltage $V_C$ is capable of independently changing and hence of controlling the output voltage but yet there may occur times when both change and the change of one nullifies the other, thereby producing no change in the output voltage.

The anticipation circuit 51 includes a diode 102, condenser 103 and resistor 104 parallelly connected between the cathodes of the SCS's 41 and 42 and the ground 50. It functions to maintain the relay switches 31 and 34 closed during the half cycle when the conducting SCS does not have current flow by limiting the rate of decrease of the voltage drop across the diode 102 during this nonconduction half cycle.

It will accordingly be appreciated that there has been disclosed a stabilizing regulator that is capable of controlling a condition of an electric load by regulating the output voltage to the load in response to an electric signal indicative of the condition which the load is desired to achieve. Moreover, the stabilizing regulator functions to immediately correct changes in the voltage of the source of electric power and thus prevents said change from effecting a delayed change of the condition. This is achieved by algebraically adding the voltage indicative of the output voltage which is necessary to achieve the desired condition of the load and a voltage related to the output voltage. The sum voltage is then the voltage which is employed to command the regulating means to effect the required changes in the output voltage.

Variations and modifications may be made within the scope of the claims and portions of the improvements may be used without others.

I claim:

1. A stabilizing regulator connectible between a source of electrical energy and an electric load having a condition desired to be maintained substantially constant and producing an electric signal indicative of an output voltage of the regulator necessary to achieve the condition comprising input means connectible to the source of alternating current, output means connectible to the electric load and at which the output voltage appears, regulating means connected between the input and output means for regulating the value of voltage at the output means and including a first channel means which upon actuation increases the value of the output voltage and a second channel means which upon actuation decreases the value of the output voltage, means connectible to the output means for providing a unidirectional voltage having a value related to the value of the output voltage, means connectible to a source of electrical energy for providing another unidirectional voltage having a substantially constant value, means for providing a unidirectional voltage from and related to the electric signal, means interconnecting the three voltage providing means to add the three unidirectional voltages to produce an algebraic sum voltage, and means for receiving the algebraic sum voltage and causing energization of the first channel when the sum voltage is of one sense and for causing energization of the second channel when the sum voltage is of the opposite sense.

2. A stabilizing regulator connectible between a source of electrical energy and an electric load having a condition desired to be maintained substantially constant and producing an electric signal indicative of an output voltage of the regulator necessary to achieve the condition comprising input means connectible to the source of alternating current, output means connectible to the electric load and at which the output voltage appears, regulating means connected between the input and output means for regulating the value of voltage at the output means and including a first channel means which upon actuation increases the value of the output voltage and a second channel means which upon actuation decreases the value of the output voltage, first means connectible to the output means for providing a unidirectional voltage having a value related to the value of the output voltage, second means connectible to a source of electrical energy for providing another unidirectional voltage having a substantially constant value, third means for providing a unidirectional voltage from and related to the electric signal, means interconnecting the three voltage providing means to add the three unidirectional voltages to produce an algebraic sum voltage with the polarity of the voltage of the second means being opposite to the polarity of the voltage of the third means, and means for receiving the algebraic sum voltage and causing energization of the first channel when the sum voltage is of one sense and for causing energization of the second channel when the sum voltage is of the opposite sense.

3. The invention as defined in claim 2 in which the voltage of the third means is variable between a minimum and maximum value and the voltage of the second means is substantially equal to the minimum value of the voltage of the third means.

4. The invention as defined in claim 2 in which the third means includes an adjustable means for setting the range of the values of voltage provided therefrom.

References Cited

UNITED STATES PATENTS

| | | | |
|---|---|---|---|
| 2,619,630 | 11/1952 | Stone | 323—43.5 X |
| 3,106,675 | 10/1963 | Riebs et al. | 323—43.5 |
| 3,128,424 | 4/1964 | Cooley et al. | 323—47 |
| 3,161,819 | 12/1964 | Perrins | 323—47 |
| 3,237,091 | 2/1966 | Attewell | 323—43.5 |
| 3,238,444 | 3/1966 | Perrins | 323—66 |
| 3,241,047 | 3/1966 | McCabe | 323—43.5 |
| 3,277,320 | 10/1966 | Conner | 323—43.5 X |
| 3,297,938 | 1/1967 | Sylvan | 323—43.5 |

JOHN F. COUCH, *Primary Examiner.*

A. PELLINEN, *Assistant Examiner.*